Jan. 20, 1959 C. R. BUSCH 2,869,683
RAILWAY BRAKE MECHANISM
Filed Nov. 10, 1955 4 Sheets-Sheet 1

INVENTOR:
CHARLES R. BUSCH
BY
Marrison, Kennedy Campbell
ATTORNEYS

Jan. 20, 1959 C. R. BUSCH 2,869,683
RAILWAY BRAKE MECHANISM
Filed Nov. 10, 1955 4 Sheets-Sheet 4
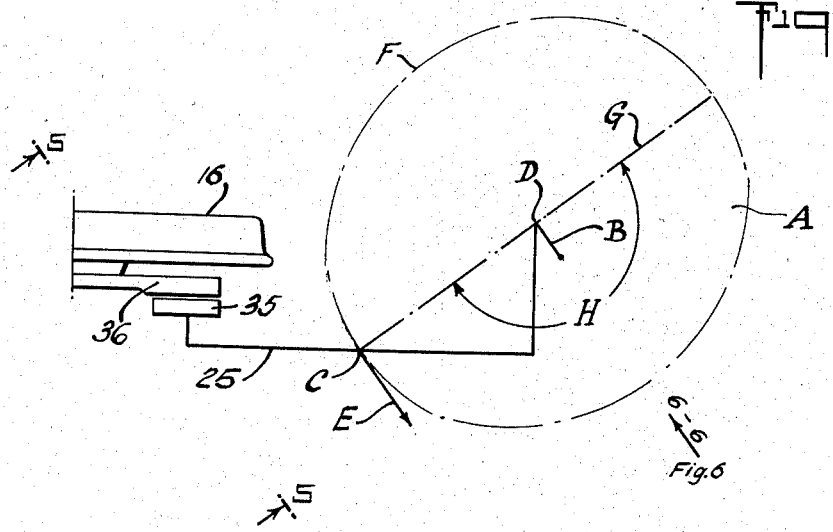
Fig.4.
Fig.6
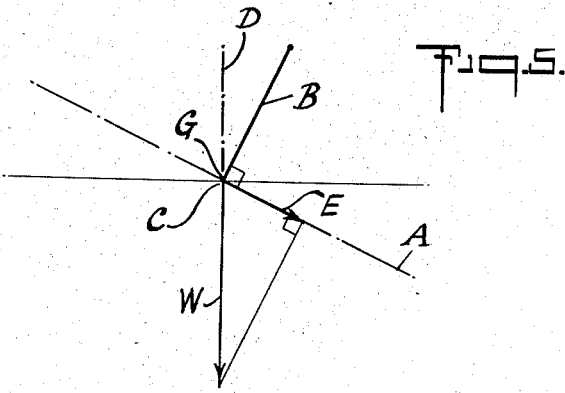
Fig.5.
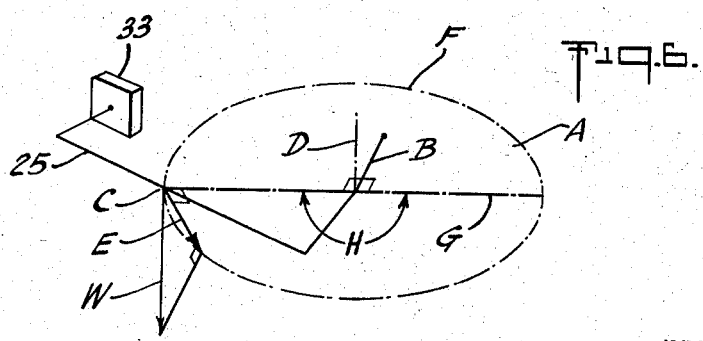
Fig.6.
INVENTOR:
CHARLES R. BUSCH.
BY
Morrison, Kennedy, Campbell
ATTORNEYS.

United States Patent Office 2,869,683
Patented Jan. 20, 1959

2,869,683

RAILWAY BRAKE MECHANISM

Charles R. Busch, Orange, N. J., assignor to Buffalo Brake Beam Company, a corporation of New York Application November 10, 1955, Serial No. 546,120

3 Claims. (Cl. 188—59)

The present invention relates to railway car brake mechanisms, especially of the freight type.

The conventional railway freight car has two trucks, each with side frames and four wheels arranged into two sets of coaxial wheels on two axles supported on said side frames. In copending application Serial No. 491,838, filed March 3, 1955, there is disclosed a rotor brake disc type of brake mechanism for these wheels, in which the brake shoes are applied for braking action against the faces of friction discs rotatable with respective wheels. In this construction, there is provided a brake head lever for each brake disc carrying a brake shoe and supported for pivotal movement about a vertical axis into and out of braking position in relation to the corresponding brake disc. It may be desired to avoid the use of springs to move the brake shoes away from the brake discs upon release of the brakes.

One object of the present invention is to provide a new and improved railway car brake mechanism designed and constructed to cause the brake head levers to shift by the action of gravity away from braking position after release of the brakes, without the use of springs.

In carrying out certain features of the present invention, the axis of rotation of each brake head lever of the brake mechanism, instead of extending vertically, is inclined in a direction to produce a component of the vertical downward gravity force at the center of gravity of the brake head lever extending in a direction tending to move the brake head lever about said axis away from braking position. The inclination of the axis of rotation of the brake head lever is such, that when the brakes are released after the railway car has come to a stop, and after the car resumes its movement, the vibrations engendered by this movement, will cause the brake head lever to gravitate along an inclined plane angularly about its pivotal support and away from braking position. This will free the brake shoes from contact with their respective brake discs.

Various other objects, features and advantages of the invention are apparent from the following description and from the accompanying drawings, in which Fig. 1 is a top plan view partly in section of a railway freight car truck, showing a brake mechanism embodying the present invention;

Fig. 4 is a top plan diagrammatic view of a brake head lever showing its axis of pivotal movement inclined with some exaggeration;

Fig. 5 is a diagram of forces of the brake head lever shown in Fig. 4 when viewed approximately along the line 5—5 of Fig. 4; and Fig. 6 is a perspective somewhat diagrammatic of the brake head lever shown in Fig. 4, when viewed generally in the direction of the arrow 6—6 in Fig. 4.

Figure 1:
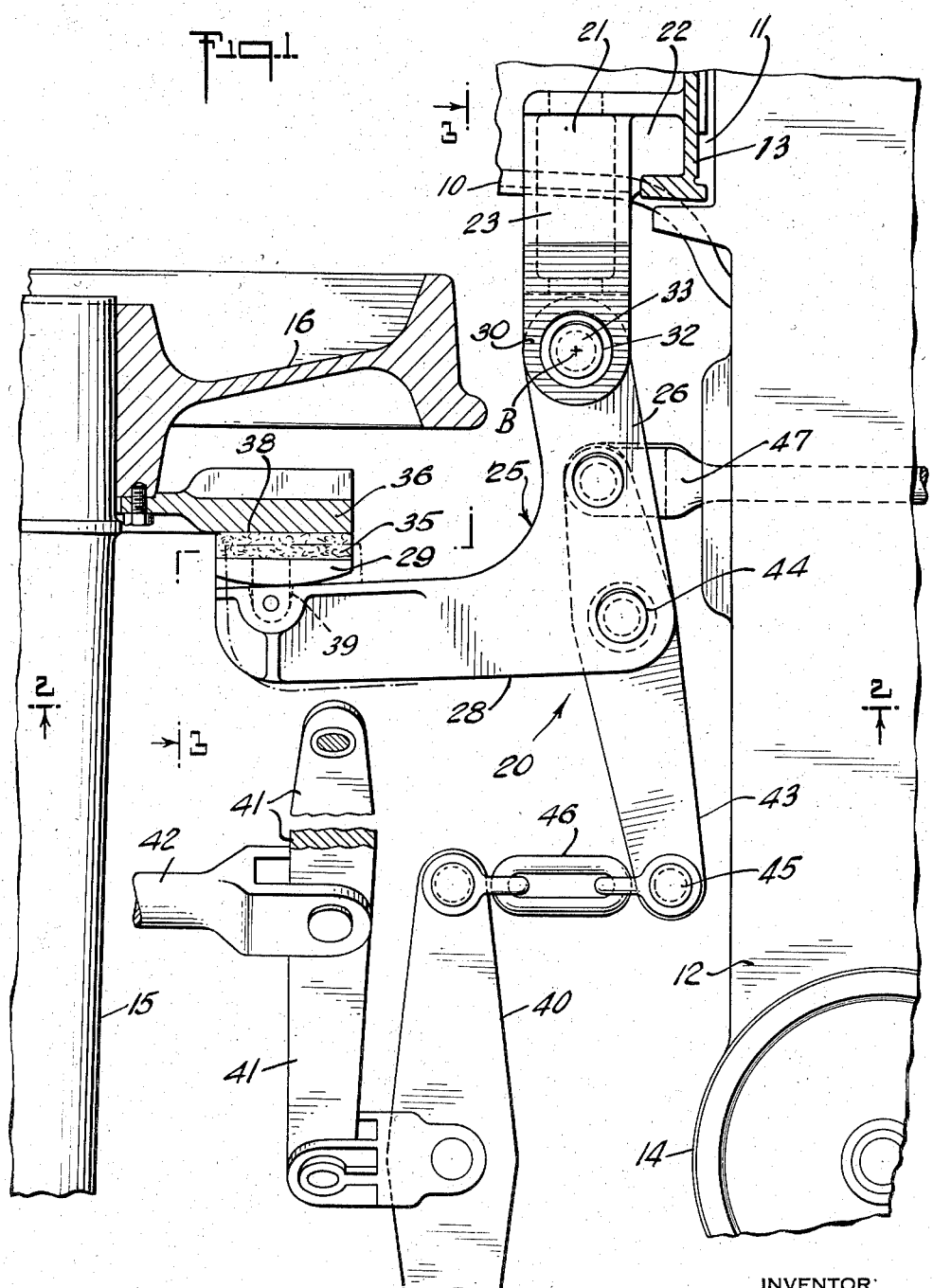
Figure 2:
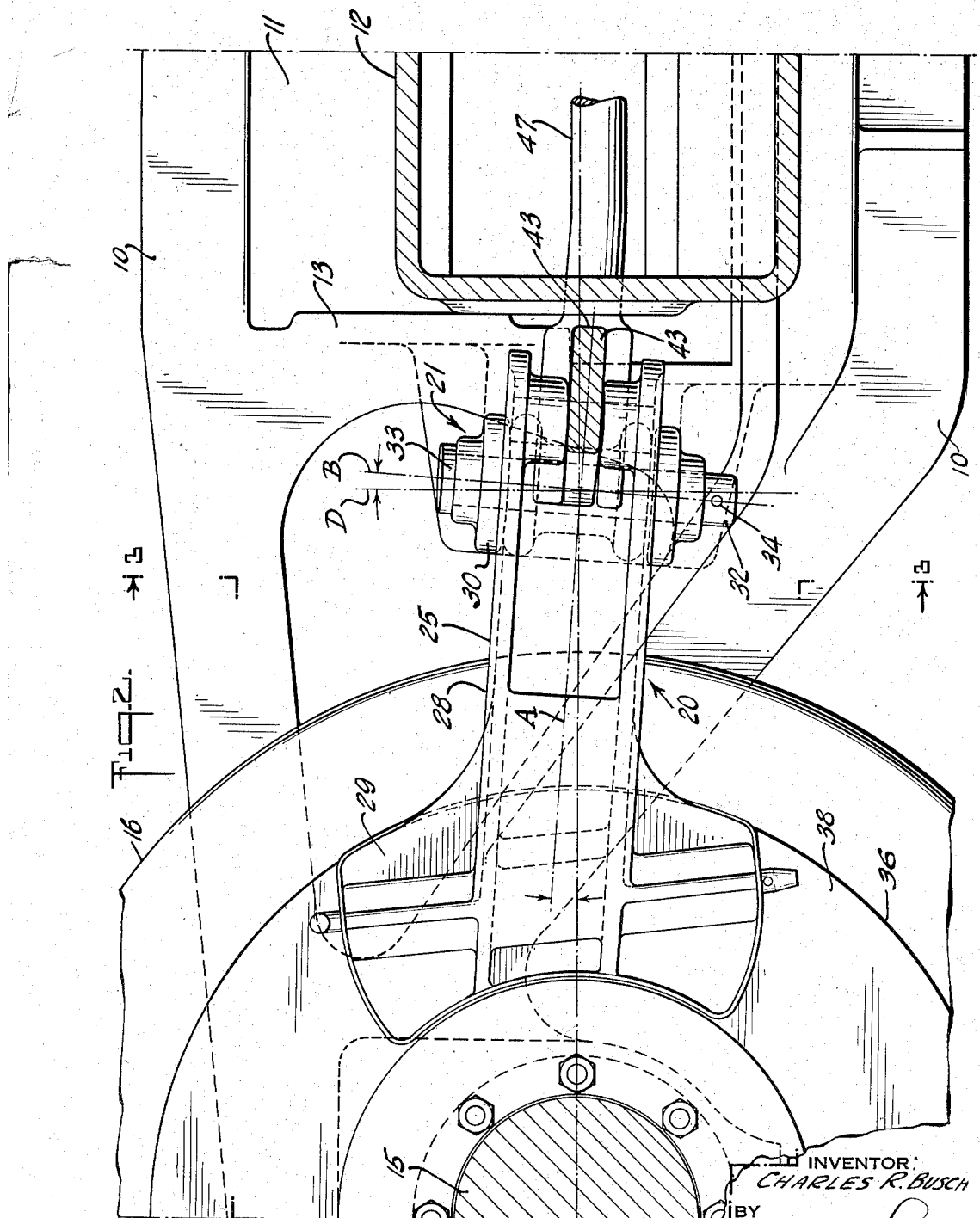
Fig. 2 is a vertical section of the railway truck taken on lines 2—2 of Fig. 1, but shown on a larger scale.
Figure 3:
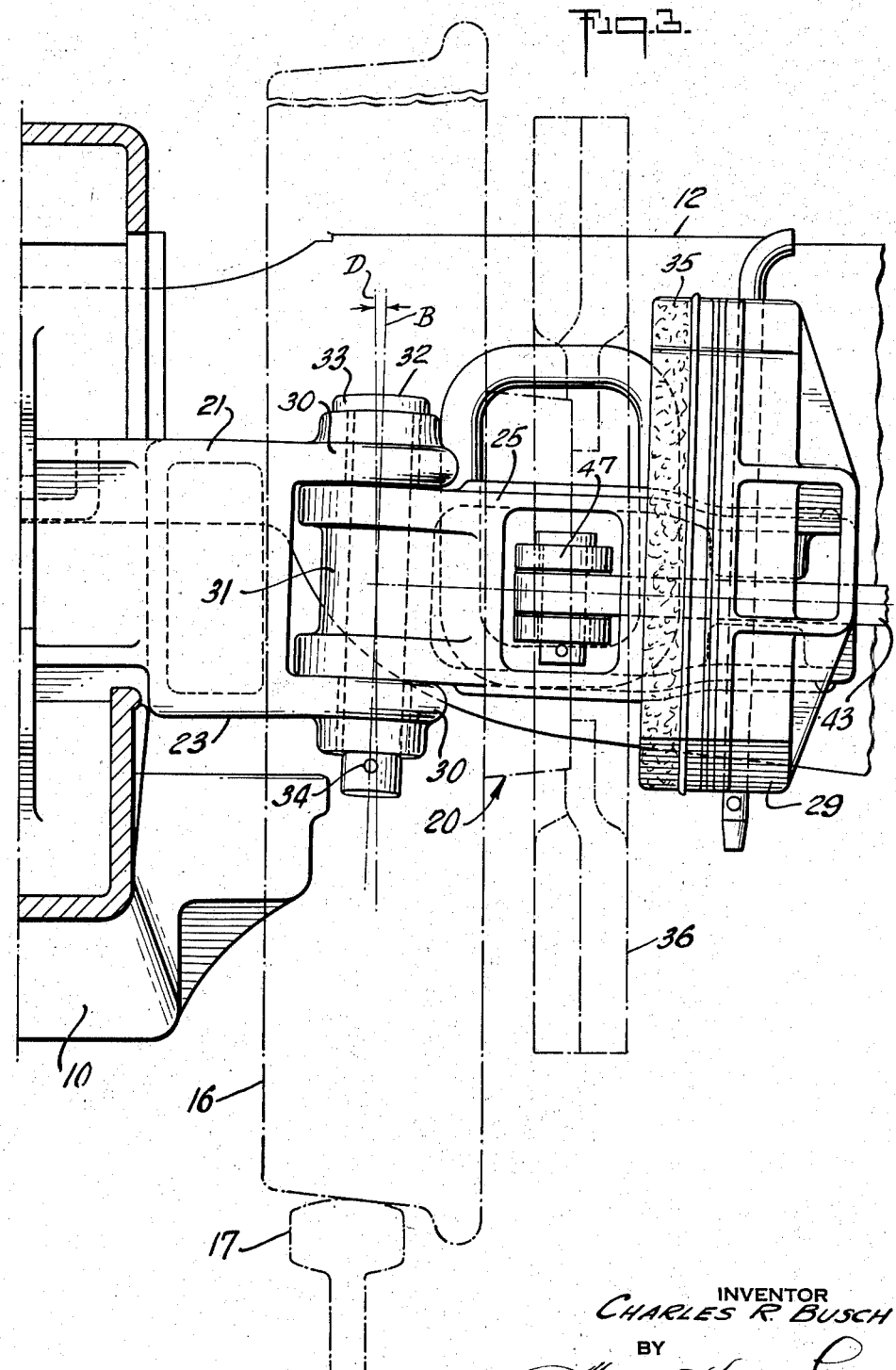
Fig. 3 is a vertical section of the railway truck taken on lines 3—3 of Figs. 1 and 2.

Referring to Figs. 1 to 3 of the drawings, the present invention is shown applied to a railway freight car truck comprising a pair of side frames 10 having respective guide openings 11 to receive the ends of a bolster 12 extending between said frames and projecting at the ends into said openings, where they are supported on coil springs (not shown) and are guided by side columns 13 of said opening for vertical shock-absorbed movement. The bolster 12 has a center conformation 14 for direct pivotal connection to the underside of the railway car body. Between the two side frames 10 and supported thereon by suitable bearings are two parallel axles 15 carrying at opposite ends flanged car wheels 16 which ride on rails 17.

The car truck described is of conventional well-known construction and is more fully described and shown in the aforesaid copending application.

The brakes for the four car wheels 16 of each car truck are operated by four sets of linkages 20 (only one being shown) interconnected and preferably actuated from a single source of power, as will be described, although each pair of linkages on each side of the bolster may be operated from a separate power cylinder connected to the truck. These brake operating linkages 20 are supported from respective brackets 21 flanking the bolster 12 and rigidly connected to the side frames 10 on opposite sides of the bolster guide opening on said side frames. Each of these brackets 21 is welded or otherwise rigidly connected to the side frames 10 and is in the form of an L having a short leg 22 rigidly connected to a corresponding guide bolster column 13, and extending along the corresponding side frame and a longer leg 23 extending inwardly and transversely of said side frame substantially midway between the bolster 12 and the adjacent car wheel 16.

Each brake operating linkage 20 comprises a brake head L-shaped lever 25, one leg 26 of which is pivotally connected to the end of the bracket leg 23, the other leg 28 carrying at its end a segmental brake head 29. For providing a pivotal connection of ample strength between the brake head lever 25 and the bracket 21, this connection is in the form of a knuckle joint and to that end, the bracket has a pair of spaced projections 30 flanking a hub projection 31 at the end of the lever, these projections being retained in interconnected pivotal relationship by an upright hinge pin 32 passing through eyes or openings in said projections and presenting large bearing surfaces. The hinge pin 32 may be retained in position by a head conformation 33 at one end and a cotter pin 34 near the other end. Each of the brake head levers 25 is thereby supported to move about its pivot support 32 into and out of braking position in a plane which is horizontal except for the slight tilt to be described.

At the brake end of the lever 25, the lever carries the segmental brake head 29, to which is connected a correspondingly shaped segmental shoe 35 for application to a brake rotor or disc 36 rigid with the corresponding car wheel 16 and having an annular brake surface 38 which is substantially vertical. The brake shoe 35 has a yieldable connection 39 with the brake head 29, allowing said brake head to rock and thereby to align the brake shoe automatically into continuous face braking contact with the brake surface 38 of the disc 36, upon application of the brake.

Power is applied to the four brake head levers 25 simultaneously through a bridle beam 40 extending on one side of the bolster 12 horizontally across the center line of the car truck with its middle region substantially on said center line. The intermediate section of the beam 40 is supported from the car body by a lever 41 power-actuated by a pull rod 42 from a source of power, as for example, the usual air cylinder. Power is transmitted from the beam 40 simultaneously to the two brake head levers 25 on one side of the bolster 12 by means of brake arms 43 (only one being shown), each pivotally supported at 44 to the elbow of the corresponding brake head lever 25 and having a pivotal connection at one end 45 with the corresponding end of the bridle beam 40 through a flexible connection 46 serving also as a lost-motion connection permitting the brake head lever 25 to move away from braking position when braking power is released. For transmitting power from the brake arms 43 on one side of the bolster 12 to the brake head levers 25 on the opposite side, there are provided two brake arms (not shown) extending parallel to the corresponding arms 43 and pivoted intermediate their ends to the elbows of the respective brake head levers on said opposite side of the bolster, these brake arms being fulcrumed at one end to brackets (not shown) affixed to the latter side of the bolster. The latter brake arms so fulcrumed, are operated from the brake arms 43 by push rods 47 (only one being shown), each passing through the bolster 12 and pivotally connected at its ends to a pair of said brake arms on opposite sides of the bolster.

The construction so far described, except for the tilting of the plane of movement of each brake head lever 25, is the subject-matter of the aforesaid copending application and reference is made thereto for details.

If the axis of each hinge pin 32 is exactly vertical, then the corresponding brake head lever 25 supported therefrom will move horizontally angularly about said axis into position to apply its brake shoe 35 against the brake disc 36 for braking operation. This will bring the car to a stop or at least slow up its speed. When the brake power is released, although the brake lever 25 is free to move angularly about the axis of the hinge pin 32 in a direction to move the brake shoe 35 out of contact with the brake surface 38 of the brake disc 36, there is no positive influence urging said brake lever to move in this direction, except perhaps the inherent resiliency of the different parts of the braking mechanism. This inherent resiliency acts instantly at the time of brake release, and may not be sufficient to move the brake shoes out of contact with the brake surfaces of the brake discs.

As a feature of the present invention, the upright axis of each hinge pin 32, instead of extending vertically, is tilted with respect to the vertical preferably by a small angle in a direction to produce a component of the downward gravity force at the center of gravity of the brake head lever 25 extending in a direction tending to rotate said lever out of braking position in relation to its brake disc 36. Figs. 4, 5 and 6 show diagrammatically the manner and direction in which the axis of the hinge pin 32 is tilted, the forces created and their effect on the brake head lever 25.

A brake head lever 25 will rotate in its movements into and out of braking position in the plane A extending at right angles to the axis B of the hinge pin 32. This plane A is assumed to pass through the center of gravity at C of the brake head lever 25 including its brake shoe 35. D indicates a vertical line along which the hinge pin 32 would extend if its axis were vertical.

If the axis B of the hinge pin 32 were vertical and coincident with the vertical line D, then the plane A at right angles to said axis would be horizontal. In this position of the axis B, the gravity force W due to the weight of the brake head lever 25, including its brake head 29 and its shoe 35, acting vertically downward from the center of gravity C of the brake head lever, would have no component in this horizontal plane, tending to rotate said brake head lever 25 either in or out of brake applying position. However, the plane A is not horizontal, but is tilted by the inclination of the axis B in a direction to create a component E of the gravity force W extending in a direction tangential to a circle F in said plane having the hinge axis B as the center and passing through said center of gravity.

The tilted plane of any circle has a horizontal diametrical axis about which the plane is tilted. A tangent to this circle in this tilted plane will have an inclination with respect to the horizontal, which will vary as the tangent moves around the circle, and which reaches a maximum when said tangent is at the ends of the horizontal diametrical axis and a minimum of zero when the tangent is at the ends of a diametrical axis in said planes at right angles to said horizontal axis.

The inclination of the tangent of the circle in the tilted plane determines the magnitude of the component of a gravity force at the point of tangency, this component force increasing as the inclination of this tangent increases. Therefore, to obtain the maximum of component force tending to move the brake head lever 25 away from braking position with a minimum of tilt of the plane A, the axis B of the hinge pin 32 must be tilted in a direction, so that a plane at right angles thereto passes through the center of gravity C of the brake head lever 25 and contains a horizontal diametrical axis passing through said center of gravity and through said axis. This horizontal diametrical axis is indicated as G in Figs. 4, 5 and 6 and the axis B of the hinge pin 32 is shown as being inclined in the direction to meet the conditions of maximum component force and of minimum tilt indicated above. The component force E of the gravity force W along the tangent at the center of gravity C extends in an inclined direction tending gravitationally to rotate the brake head lever 25 about the axis B in the direction to move the brake shoe 35 thereof away from the brake disc 36.

It should be noted that although the hinge axis B of the hinge pin 32 is preferably tilted in a direction at right angles to the horizontal line G passing through the center of gravity C of the brake head lever 25 and through the hinge axis, it can be tilted so that the part of the hinge axis above said line lies in any direction within a range of 180° on one side of the vertical plane of said horizontal line indicated by the angle H. In any tilted position within this range, the brake head lever 25 will have a component of the gravity force W tending to rotate this lever out of braking position. As this hinge axis departs from the preferred position shown in Figs. 4, 5 and 6, towards the two limits of the range H, the amount of component force tending to rotate the brake head lever 25 decreases, becoming zero at these limits. Consequently, within the more limited aspects of the invention, it is contemplated that the axis of the hinge pin 32 of the brake head lever 25 be tilted within the range H.

The extent to which the axis of the hinge pin 32 of the brake head lever 25 is tilted in relation to the vertical depends on the weight and shape of the brake head lever and the extent of friction acting on the bearing parts connected with said lever resisting movement of said lever away from braking position. If the extent of tilting is too large, it may introduce eccentric bending stresses in certain parts of the braking mechanism and may add substantially to the power necessary to move the brake head lever 25 into braking position. The extent of tilting of the axis of the hinge pin 32 need not be large enough, and preferably is not large enough to cause the brake head lever 25 to move out of contact with the brake disc 36, unaided by the vibrations of the moving car. The angle of tilt should preferably be small enough to prevent the undesirable effects described above and large enough to cause the brake shoe 35 of the brake head lever 25 to shift by the vibrations of the moving car out of contact with the brake disc 36 when the brakes are released. The lost-motion connection in the car truck afforded by the flexible connection 46 permits this release of the brakes merely by the vibration of the car truck. In a specific embodiment, this angle of tilt may, for example, be between 5° and 10°.

While the invention has been described with particular reference to a specific embodiment, it is to be understood that it is not to be limited thereto, but is to be construed broadly and restricted solely by the scope of the appended claims.

What is claimed is:

1. In a brake mechanism for a car wheel of a railway truck, a member rigid with said car wheel and presenting a brake surface, a brake head lever having a shoe for brake engagement with said brake surface, means pivotally supporting said brake head lever for substantially horizontal angular movement about an upright axis, and means for moving said brake head lever about said axis into braking position in relation to said brake surface, said means including a lost-motion connection on said truck permitting said lever to move angularly away from braking position when braking power is released, said upright axis being tilted from the vertical, the plane of the center of gravity of the combined brake head lever and brake shoe at right angles to said axis having a tangent therein to the circle of said center of gravity about said axis as a center sloping downward and away from the brake surface when the lever is in braking position, whereby said brake head lever is urged by gravity away from braking position, and is moved away from braking position at least by the vibration engendered by the movement of the railway truck along its tracks when braking power is released.

2. In a brake mechanism for a car wheel of a railway truck, the combination as described in claim 1, wherein the upright axis is tilted about a horizontal axis passing through said upright axis and through the center of gravity and lying in said plane.

3. In a brake mechanism for a car wheel of a railway truck, the combination as described in claim 1, wherein the upright axis is tilted 5 to 10° from the vertical.

References Cited in the file of this patent

UNITED STATES PATENTS

| | | |
|---|---|---|
| 811,010 | Weber | Jan. 30, 1906 |
| 1,779,776 | Masion | Oct. 28, 1930 |
| 1,797,895 | Baselt | Mar. 24, 1931 |
| 2,053,098 | Mills | Sept. 1, 1936 |
| 2,352,222 | Pogue et al. | June 27, 1944 |